US000001867H

United States Statutory Invention Registration [19]

[11] Reg. Number: H1,867

Quiram

[45] Published: Oct. 3, 2000

[54] VARIABLE CUT SCROLL SAW

[76] Inventor: Ronald Quiram, 21 Overshot Ct., Phoenix, Md. 21131

[21] Appl. No.: 08/899,938

[22] Filed: Jul. 24, 1997

[51] Int. Cl.[7] ..... B27B 13/08

[52] U.S. Cl. ..... 83/781; 83/13; 83/581.1; 83/691.1; 83/699.21; 83/779; 83/816; 83/699.11

[58] Field of Search ..... 83/781, 816, 581.1, 83/699.21, 747, 776, 779, 785, 786, 782, 783, 811, 812, 820, 778, 571, 640, 625, 626, 647, 651.1, 662

[56] References Cited

U.S. PATENT DOCUMENTS

| | | | |
|---|---|---|---|
| 199,845 | 1/1878 | McChesney | 83/699.21 X |
| 1,467,720 | 9/1923 | Field | 83/785 X |
| 4,238,884 | 12/1980 | Walton, II | 83/776 X |
| 4,342,241 | 8/1982 | Eklund | 83/820 X |
| 4,356,750 | 11/1982 | Legler et al. | 83/817 X |
| 4,825,741 | 5/1989 | Wellington et al. | 83/781 X |
| 5,018,420 | 5/1991 | Plomb | 83/816 X |
| 5,267,498 | 12/1993 | Miyamoto et al. | 83/662 X |

*Primary Examiner*—Harold J. Tudor
*Attorney, Agent, or Firm*—Adan Ayala

[57] ABSTRACT

The scroll saw disclosed herein includes a frame with a worktable for supporting workpieces, first and second blade clamps for clamping a blade therebetween, an oscillating mechanism disposed within the frame, the oscillating mechanism moving the first and second blade clamps in a direction along a substantially vertical axis, wherein one of the first and second blade clamps is selectively shiftable so that the blade is shifted to a selected angle from the vertical axis. Preferably, a cam is used to move one of the blade clamps.

26 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VARIABLE CUT SCROLL SAW

FIELD OF THE INVENTION

This invention relates generally to scroll saws and, more particularly, to a scroll saw that can be adjusted from fine to coarse (aggressive) cutting.

BACKGROUND OF THE INVENTION

Scroll saws are typically of three types: parallel arm scroll saws, one-piece C-arm shaped scroll saws, or cable scroll saws. Parallel arm scroll saws include upper and lower horizontally extending arms which pivot in unison about vertically aligned pivot pins. Examples of such saws are shown in U.S. Pat. Nos. 4,616,541, 4,838,138 and 4,841,823.

C-arm shaped scroll saws connect upper and lower arms in a single C-shaped arm structure which pivots about a pivot point located on the bight end portion of the C-shaped arm structure. Examples of such saws are shown in U.S. Pat. Nos. 4,503,742, 4,625,609 and 4,646,605.

Cable scroll saws have cables, instead of arms, that are connected directly or indirectly to the blade holders. The cable scroll saws have low moving masses, which help reduce vibration. In addition, such designs produce a portable, low cost scroll saw. Examples of such saws are shown in U.S. Pat. Nos. 199,845, 1,820,294 and 2,810,410, as well as Canadian Patent Application No. 2,104,569.

All these saws have vertical, or near vertical, cutting blade paths. These allow for fine cutting, as users demand precision in their cutting. However, this limits the use of the scroll saw to only fine work. However, sometimes users want faster cuts.

It is an object of this invention to provide a scroll saw that allows both fine and coarse cutting of workpieces, thus providing greater flexibility than prior art scroll saws.

SUMMARY OF THE INVENTION

In accordance with the present invention, an improved scroll saw is employed. The scroll saw includes a frame with a worktable for supporting workpieces, first and second blade clamps for clamping a blade therebetween, an oscillating mechanism disposed within the frame, the oscillating mechanism moving the first and second blade clamps in a direction along a substantially vertical axis, wherein one of the first and second blade clamps is selectively shiftable so that the blade is shifted to a selected angle from the vertical axis. Preferably, a cam is used to move one of the blade clamps.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
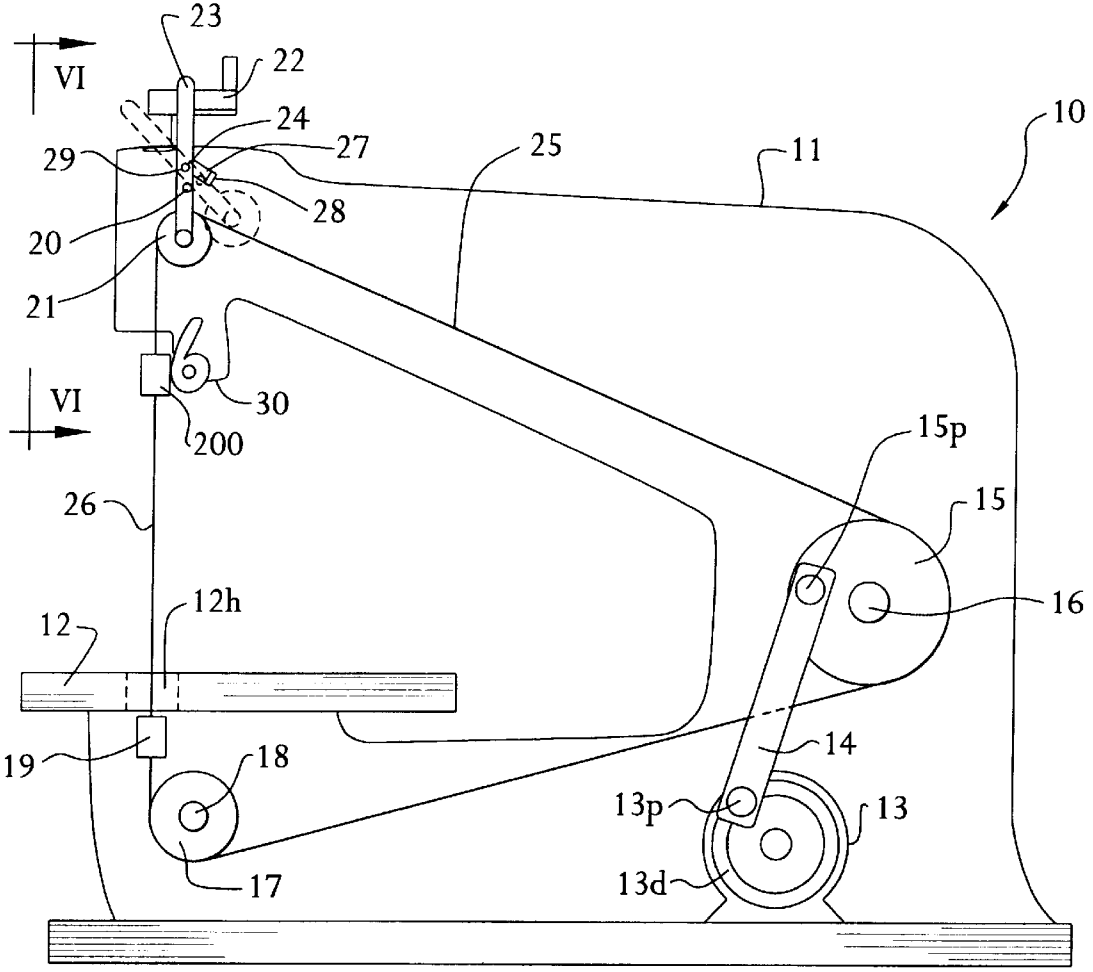
FIG. 1 is a partial cross-sectional side view of a scroll saw of the present invention.
Figure 2:
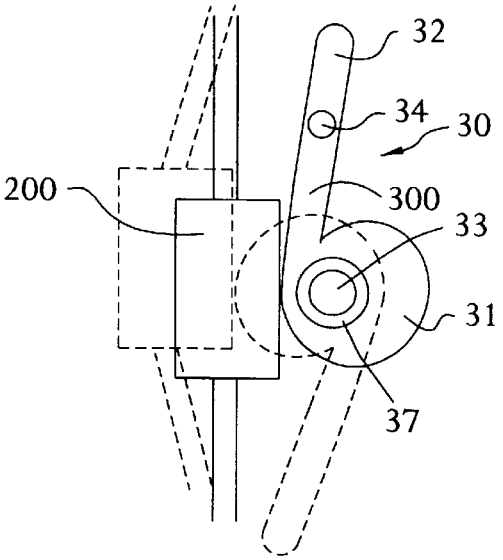
FIG. 2 is a side elevational view of a blade clamp shifting mechanism.

The invention is now described with reference to the accompanying figures, wherein like numerals designate like parts. Referring to FIG. 1, a cable scroll saw 10 is shown as an exemplary scroll saw. However, the present invention can be implemented in other types of scroll saw.

Scroll saw 10 of the present invention includes a frame 11. Preferably, frame 11 is hollow and carries most of the elements described below within. In addition, the frame 11 may be C-shaped.

The frame 11 carries a table 12 for supporting a workpiece (not shown). It will be noted that the table 12 extends within the opening of the frame. The table 12 has a slot or hole 12*h,* allowing a blade 26 to extend therethrough.

The blade 26 is held by an upper blade clamp 200 and a lower blade clamp 19. An oscillating drive mechanism moves the blade clamps up and down along a substantially vertical axis. As shown in FIG. 1, the drive mechanism includes a motor 13. The motor 13 rotates a driving wheel 13*d,* which in turn has a crank pin 13*p* thereon.

A driving pulley 15 is disposed nearby. The driving pulley 15 rotates about a pivot 16, preferably connected to the frame 11. In addition, the pulley 15 has a pulley pin 15*p*. The crank pin 13*p* and the pulley pin 15*p* are connected via a connecting arm 14, so that, when the motor 13 rotates the driving wheel 13*d,* the pulley 15 will also rotate. However, because the driving wheel 13*d* and the driving pulley 15 have different diameters, the driving pulley 15 will oscillate instead of making full revolutions.

A cable 25, preferably made of stainless steel, connecting the upper blade clamp 200 and the lower blade clamp 19 is disposed around the driving pulley 15. Because of the oscillating motion of the driving pulley 15, the cable 25 will also oscillate. Persons skilled in the art will recognize that cable 25 can be attached to the pulley 15 to prevent slippage.

Upper pulley 21, pivoting about pivot 20, and lower pulley 17, pivoting about pivot 18, help direct the oscillating motion into a substantially vertical oscillating motion. It is preferable that the pivot 18 be fixed to the frame 11.

Figure 6:
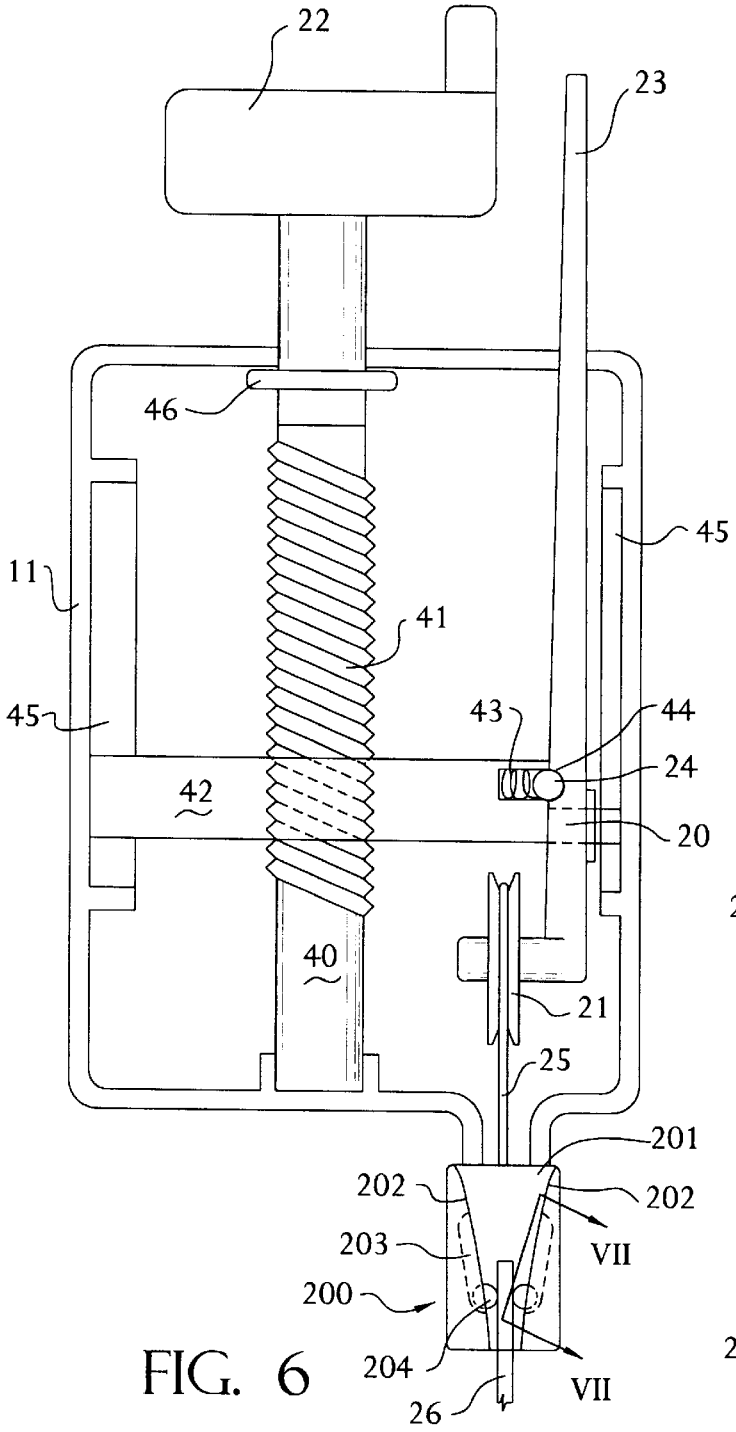
FIG. 6 is a partial cross-sectional front view along line VI—VI of FIG. 1.

Referring to FIGS. 1 and 6, the upper pulley 21 is connected to a lever 23. The lever 23 is pivotally connected about pivot 20. Accordingly, the lever 23, and thus the upper pulley 21, can pivot about pivot 20. By rotating the upper pulley 21 towards the rear, the tension of the cable 25 is diminished, allowing for easy blade removal as discussed below.

The pivot 20 is part of a carrying assembly 42. In addition to the pivot 20, the carrying assembly has a detent mechanism in order to maintain the lever 23 at a certain position, so that cable tension is at a maximum. The detent mechanism includes a detent ball 24 biased by a spring 43 against lever 23. The lever 23 has a detent hole 44 that receives the ball 24. In addition, the lever 23 has an extension 27, preferably arcuate-shaped, which contacts the ball 24 while the lever 23 is being rotated.

Stops 28,29 are preferably provided on the extension 27 and the lever 23 to limit the range of rotational movement of lever 23. These stops 28,29 contact the carrying assembly 42.

The carrying assembly 42, and thus the upper pulley 21, may be moved up and down, also affecting cable tension. This may be done via a threaded shaft 40 having threads 41 which mesh with threads in the carrying assembly 42. The carrying assembly 42 is preferably disposed in channels 45 at both ends, limiting any rotational movement. Accordingly, as a user rotates the shaft 40 via knob 22, the rotational movement of the shaft 40 is translated into vertical linear movement of the carrying assembly 42. Shaft 40 may also be provided with a retainer ring 46 to prevent accidental removal of the shaft 40.

Referring to FIGS. 1, 2, 4 and 5, a shifting mechanism 30 is preferably disposed next to the upper blade clamp 200. This mechanism allows the user to move the blade clamp 200 in order to change the angle of the blade 26 relative to the vertical axis, changing the type of cut. Persons skilled in the art will recognize that the shifting mechanism may be placed next to the cable 25 or pulley 21 to achieve the same result. Accordingly, such solutions are equivalent to the one described below.

A preferred embodiment of the shifting mechanism 30 includes a cam 300 having a camming surface 31 contacting the blade clamp 200. The cam 300 pivots about pivot 33 and is kept on the pivot 33 by a retainer ring 37. Pivot 33 may be fixedly connected to the frame 11.

In order to change the cutting path of blade 26, a user need only move lever 32 to vary how much the blade clamp 200 is shifted. The camming surface 31 then moves the blade clamp 200. Preferably, the camming surface 31 is calibrated so that the shift amount of the blade clamp 200 is directly proportional to the cam movement about pivot 33.

Figure 3A:
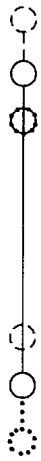
FIGS. 3A and 3B illustrate the blade cutting path for a blade moving along a substantially vertical axis and a blade shifted to a selected angle from the vertical axis.

FIG. 3A illustrates the cutting path of blade 26 when it moves along a substantially vertical axis, where the solid lines show the middle position, the broken lines show the higher position and the dotted lines show the lower position. This cutting path is used for fine work.

Figure 3B:
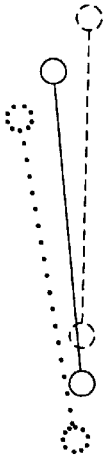
Figure 4:
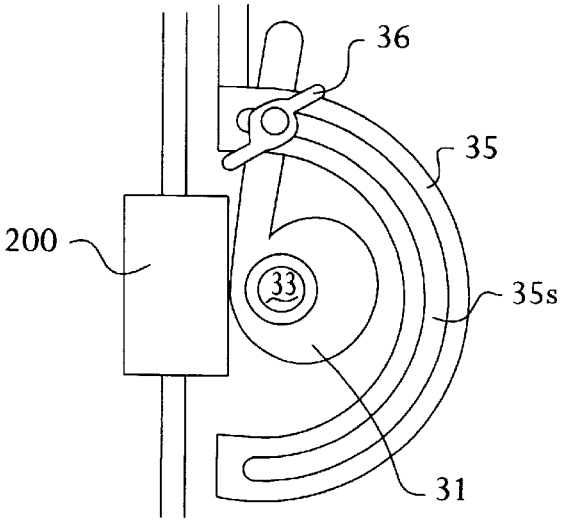
FIG. 4 is a side elevational view of an alternative blade clamp shifting mechanism.
Figure 5:
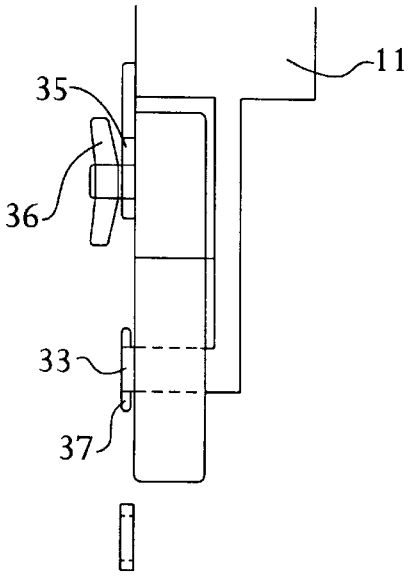
FIG. 5 is a partial cross-sectional rear view of the blade clamp shifting mechanism of FIG. 4.

FIG. 3B illustrates the cutting path of blade 26 when the blade clamp 200 has been shifted. Again, the solid lines show the middle position, the broken lines show the higher position and the dotted lines show the lower position. As shown in FIG. 3B, the cutting path is more aggressive and allows for faster, yet coarser, cuts.

It is preferable to lock the cam 300 in place, in order to ensure that the blade clamp 200 does not unintentionally shift positions during cutting. A locking track 35 fixedly connected to the frame 11 has an arcuate slot 35*s*, which follows the arcuate trajectory of a boss 34 disposed on the lever 32. A thumbscrew or wingnut 36 can then be disposed on the other side of the track 35. A user need only to screw on the wingnut 36 to fix the position of cam 300.

Figure 7:
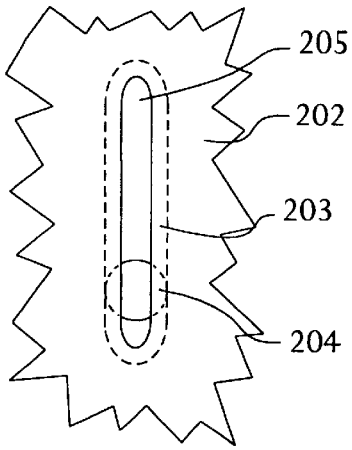
FIG. 7 is a view of the blade clamp along line VII—VII of FIG. 6; apparatus according to a second embodiment of the present invention.

Another aspect of the invention is a new toolless blade clamp. Referring to FIGS. 6 and 7, the upper blade clamp 200 has a body 201. The body 201 has inclined surfaces 202. Preferably, the inclined surfaces 202 are exposed. Channels 203 for carrying sliding/rolling elements are provided underneath the inclined surfaces 202. As shown in FIGS. 6 and 7, the preferred sliding/rolling element is a ball 204. Preferably, the channel 203 is shallow enough that a portion of the ball 204 extends through and above a slot 205 on the inclined surface 202. It is also preferable that the slot 205 be narrow enough to ensure that the ball 204 is kept within the channel 203.

In order to install the blade 26, a user must release the cable tension by moving lever 23 or by lowering carrying assembly 42. Then the user inserts the blade 26 between the inclined surfaces 202. The balls 204 slide or roll upward and then fall back down, clamping the blade 26 therebetween. The user can then restore the cable tension.

In order to remove the blade 26, the user again releases the cable tension as discussed above and lifts and/or pulls the blade 26 towards the user, until the blade 26 is removed.

Figure 8A:
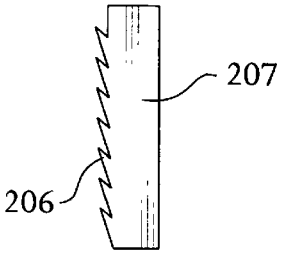
FIGS. 8A and 8B are profiles of alternative sliding holders for use in the blade clamp.
Figure 8B:
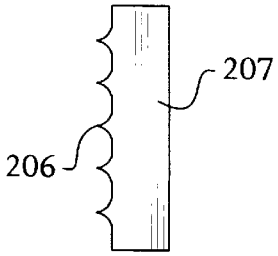

Persons skilled in the art will recognize that other sliding/rolling elements may be used instead of ball 204. For example, FIGS. 8A and 8B show two alternative sliding elements 207, which slide along channels 203 to perform the same function as ball 204. The elements 207 may be cylindrical. It may also be advantageous to provide projections 206 on the elements 207 to better grasp the blade 26.

Persons skilled in the art may also recognize other alternatives to the means disclosed herein. However, all these additions and/or alterations are considered to be equivalents of the present invention.

I claim:

1. A scroll saw comprising:

a frame;

a table connected to said frame for supporting workpieces;

first and second blade clamps for clamping a blade therebetween; and an oscillating mechanism disposed within the frame, the oscillating mechanism moving the first and second blade clamps along a substantially vertical axis, the oscillating mechanism comprising a motor, a pulley driven by the motor, and cable connected to at least one of the blade clamps, where the cable is disposed on the pulley;

wherein one of the first and second blade clamps is selectively shiftable so that the blade is shifted to a selected angle from the vertical axis.

2. The scroll saw of claim 1, wherein a cam is disposed against said one of first and second blade clamps and used to shift said one of first and second blade clamps.

3. The scroll saw of claim 1, further comprising a cable tensioning mechanism for increasing tension of said cable.

4. The scroll saw of claim 3, wherein the cable tensioning mechanism comprises a movable pulley operatively connected to said frame, said movable pulley being movable in relation to said frame.

5. The scroll saw of claim 4, wherein said movable pulley is movable in a vertical direction.

6. The scroll saw of claim 1, wherein one of said blade clamps comprises:

a body;

first and second surfaces on said body;

a channel disposed in said first surface; and a sliding element disposed in said channel.

7. The scroll saw of claim 6, wherein the blade is held between the sliding element and the second surface.

8. The scroll saw of claim 6, wherein the sliding element is a ball.

9. A method for varying cut type in a scroll saw comprising a frame, a table connected to said frame for supporting workpieces, first and second blade clamps for clamping a blade therebetween, and an oscillating mechanism disposed within the frame, the oscillating mechanism moving the first and second blade clamps in a direction along a substantially vertical axis, said method comprising the step of:

shifting one of the first and second blade clamps so that the blade is shifted to a selected angle from the vertical axis.

10. The method for varying cut type in a scroll saw of claim 9, wherein the shifting step is performed by moving a cam disposed against said one of first and second blade clamps.

11. The method for varying cut type in a scroll saw of claim 9, further comprising the step of providing a blade clamp shifting mechanism.

12. The method for varying cut type in a scroll saw of claim 11, wherein said blade clamp shifting mechanism is a cam disposed against disposed against said one of first and second blade clamps.

13. The method for varying cut type in a scroll saw of claim 11, wherein the oscillating mechanism comprises:

a motor;

a pulley driven by the motor; and a cable connected to at least one of said blade clamps, said cable being disposed on said pulley, so that the cable moves in the same direction as the pulley.

14. A blade clamp comprising:

a body;

first and second surfaces on said body;

a first channel disposed in said first surface; and a first sliding element disposed in said first channel.

15. The blade clamp of claim 14, wherein a blade is held between the first sliding element and the second surface.

16. The blade clamp of claim 14, further comprising a second channel disposed in said second surface, and a second sliding element disposed in said second channel.

17. The blade clamp of claim 16, wherein a blade is held between the first and second sliding elements.

18. The blade clamp of claim 14, wherein the first sliding element is a ball.

19. A scroll saw comprising:

a frame;

a table connected to said frame for supporting workpieces;

first and second blade clamps for clamping a blade therebetween;

an oscillating mechanism disposed within the frame, the oscillating mechanism moving the first and second blade clamps along a substantially vertical axis, the oscillating mechanism comprising a motor, a pulley driven by the motor, and a cable connected to at least one of the blade clamps, where the cable is disposed on the pulley; and a blade shifting mechanism for shifting one of the first and second blade clamps so that the blade is shifted to a selected angle from the vertical axis.

20. The scroll saw of claim 19, wherein said blade shifting mechanism comprises a cam disposed against said one of the first and second blade clamps.

21. The scroll saw of claim 19, further comprising a cable tensioning mechanism for increasing tension of said cable.

22. The scroll saw of claim 21, wherein the cable tensioning mechanism comprises a movable pulley operatively connected to said frame, said movable pulley being movable in relation to said frame.

23. The scroll saw of claim 22, wherein said movable pulley is movable in a vertical direction.

24. The scroll saw of claim 19, wherein one of said blade clamps comprises:

a body;

first and second surfaces on said body;

a channel disposed in said first surface; and a sliding element disposed in said channel.

25. The scroll saw of claim 24, wherein the blade is held between the sliding element and the second surface.

26. The scroll saw of claim 24, wherein the sliding element is a ball.

* * * * *